United States Patent Office 3,057,226
Patented Oct. 9, 1962

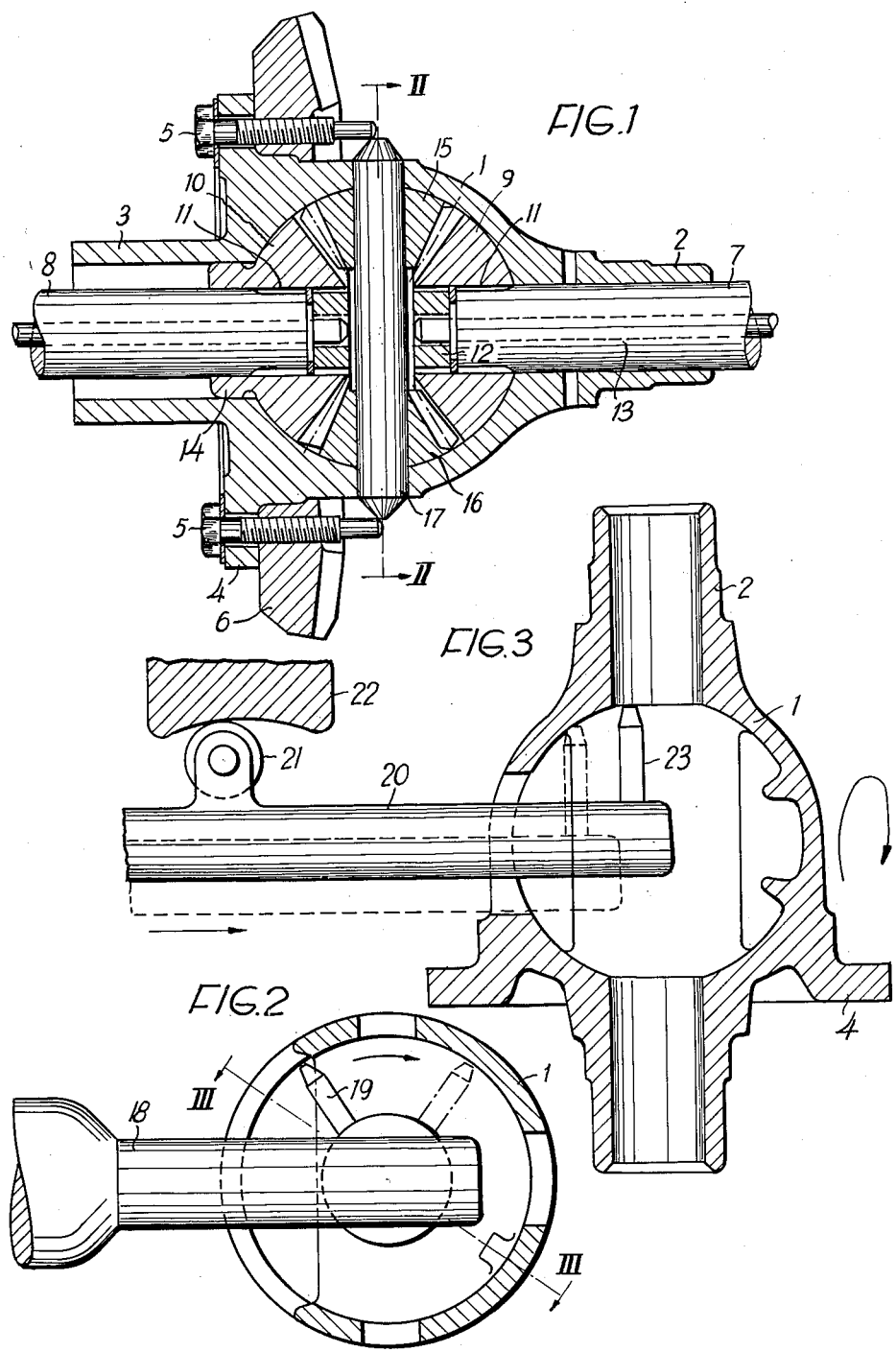

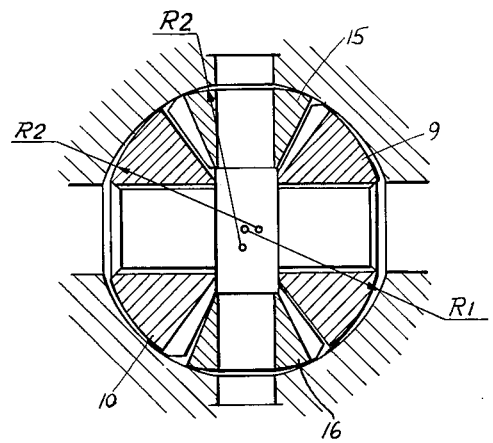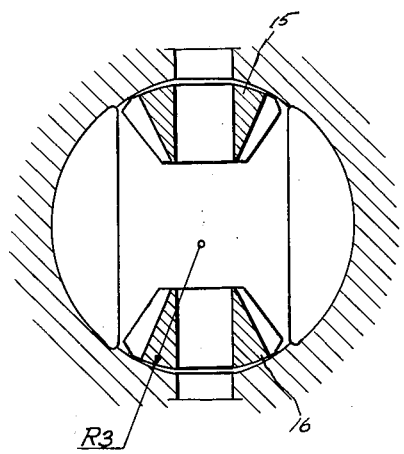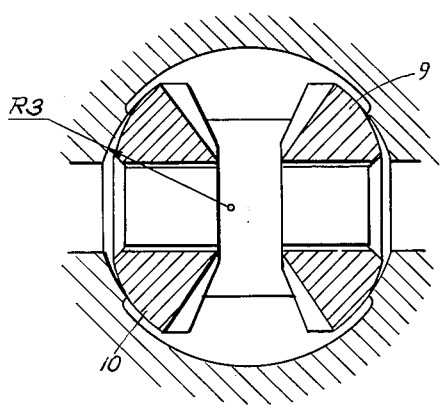

3,057,226
PLANETARY DIFFERENTIAL MECHANISM
Folke Ivar Blomberg, Trollhattan, Sweden, assignor to Svenska Aeroplan Aktiebolaget, Trollhattan, Sweden, a corporation of Sweden
Filed Sept. 30, 1959, Ser. No. 843,575
Claims priority, application Sweden Oct. 3, 1958
6 Claims. (Cl. 74—713)

This invention relates to a planetary differential mechanism containing a differential spider of bevel gears, radially guided and rotary supported in a casing.

Generally, the bevel gears of such a differential mechanism are four in number, one pair opposite each other freely beared differential equalizer bevel pinions (spider gears or planet gears), and one pair opposite each other and perpendicularly to the spider bevel pinions beared axle bevel gears, each of which situated on its half of the rear drive axle. These axle bevel gears may be radially beared either in the casing itself, in the shaft stump of an outside of the casing situated universal joint, or in a stiff driving shaft. The spider bevel pinions are, generally beared on a shaft traversing right through the casing. The axial bearing of the subject gears is produced in that way, that the back sides of the gears are lying closely attached to a suitably shaped surface inside the casing. For the axle bevel gears, generally, this surface is plain, and, for the spider bevel pinions, spherical. The machining of such a casing is a very difficult and time-consuming operation, generally being managed in that way, that a milling cutter holder bar is introduced through one of the bearing holes for the axle bevel gears, and then a cutter is fitted to the bar for the machining of the surfaces.

The principal object of the invention is to provide an improved differential mechanism, not characterized by the above mentioned drawbacks, and making a simple and inexpensive machining possible. Particularly, the subject design is suitable in the event that the casing is to be manufactured all in one casting piece. The invention is mainly characterized by the fact, that the whole inside of the casing is made like a curved rotational surface, all gears in the casing being axially guided against said curved rotational surface. According to the invention, the rotational surfaces may be spherical ones, and further, they may have common centres, and, thus, all the gears obtain their axial guiding against one and the same spherical surface. This will result in a very simple method of machining.

A preferred instance of the invention is described below in connection with the accompanying drawing, in which FIG. 1 shows an axial section of the casing through the centre axis of the axle bevel gears, the gears being fitted into their places. FIG. 2 shows a production method for the machining of the inside of the casing, the section being taken through line II—II of FIG. 1, FIG. 3 shows another method for the machining, the casing being shown sectioned through line III—III of FIG. 2, FIG. 4 is a partial section through the center axis of the gears showing the internal surface of the housing of FIG. 3 machined with different radii, FIG. 5 is similar to FIG. 4 and shows a section through the driven gears, and FIG. 6 is similar to FIG. 4 and shows a section through the driving gears.

The casing 1, which is to contain all the bevel gears of the differential, mainly consists of a ball-shaped hollow body made in one casting piece, provided with two diametrically placed bearing parts 2 and 3 and, near to the bearing part 3, with a flange 4, the main plane of which being perpendicular to the centre line through the bearing parts 2, 3. The flange 4 is utilized for the fastening—by a number of screws 5—of the big differential crown wheel 6, intended to be in engagement with the smaller-sized differential pinion gear, not shown in the drawing. The bearing parts 2, 3 serve as bearings for two shaft halves 7, 8 on which the two axle bevel gears 9, 10 of the differential are mounted by means of push-key grooves, and are tightened by a nut 12 and a traversing bolt 13. In FIG. 1, one of the axle bevel gears, 10, is provided with a shaft journal 14 for the radial guiding of the gear, whereas the other gear is not provided with such a radial guiding in the casing, but imagined is here, that this gear has got its radial guiding item placed on one of the outgoing rear axle shafts. This type of design is shown only as an example of two different design types of the radial guiding system for the axle bevel gears 9 and 10.

The two spider bevel pinions 15 and 16 are freely beared on a common shaft 17, situated in holes in the casing 1, and the centre axis of which is crossing the common centre axis of the axle bevel gears at right angles. The shaft 17 of the spider bevel pinions is protruding a little outside of the casing 1 on both sides, and is locked against moving in axial direction by two of the fastening screws 5 of the crown wheel 6, these two screws being lengthened and protruding in front of the ends of the shaft 17.

The two pairs of gears, 9, 10, and 15, 16, of the differential spider are, on their rear surfaces, formed like a sphere for the purpose of axial guiding of the gears against a mainly spherically formed rotational surface inside the casing. Thus, all the gears are axially guided against a common rotational surface, which, in this case, constitutes a sphere, the centre point of which being situated in the crossing point of the centre axes of the two gear pairs. It may also be imagined to make the spherical guiding surface of the casing deformed in such a way, that, in a particular section, it will have a certain radius, and, in another section, for instance perpendicular to the first one, it will have another radius, giving another curvature. This arrangement is shown in the exaggerated illustrations of FIGS. 4, 5, and 6, wherein the interior of the housing 1 has a somewhat flattened spherical inside surface generated by semi-circles the centre of which is displaced from the axis of the rotating surface of the corresponding gears. For example, the centres of the radii of curvature R2—R2 for the two pairs of gears 9, 10 and 15, 16 are offset from the radius of curvature R1 (FIG. 4) for the main section of the housing interior surface and are offset from the radii of curvature R3—R3 (FIGS. 5 and 6) for another section of such housing interior surface. As is illustrated in FIG. 4, the contact surface between each gear and the housing interior tends to lie toward the periphery of the gear and in FIGS. 5 and 6 the disconformity of the radii of curvature of the gears with that of the housing interior is greater than the main section. In this way, it is possible to obtain a perfect wedging-in of the lubricating oil, and, thus, a better wearing quality than with surfaces being fully attached to each other. Further, when utilizing surfaces, which are fully attached to each other, it is often necessary to introduce lubricating oil grooves, which, however, partly break the oil film, partly are expensive in manufacture. The rotational surfaces for the axial guiding of the gears must not necessarily be spherical surfaces. It may also be imagined to utilize rotational ellipsoides or other suitable rotational surfaces.

The manufacture of the rotational surface—or surfaces—inside the casing may be accomplished in several different ways. One method is shown in FIG. 2, in which a holder bar 18 being, at one of its ends, provided with a swivelling cutting steel 19. With the casing motionless, and the holder bar 18 rotating around its axis, the spherical surface inside the casing can easily be machined by making the swivelling movement of the steel 19 constitute the feed. This method will also permit the manufacture of circle arc sections of different radii, if the swivelling point of the steel on the holder bar 18 is placed at a point which is separated from the rotation axis of the holder bar. In FIG. 3, another method for the inside machining of the casing is shown. In this instance, a non-rotating holder bar 20 is utilized, which is movable in the direction of its axis, and, further, it can be moved parallel to itself, being thereby guided by a guiding roller 21 and a fixed pattern curve 22. By means of a cutting steel 23, fastened at the end of the holder bar 20, the desired rotational surface inside the casing can be machined, while the casing is rotating. Through suitable forming of the pattern curve, the rotational surface can be brought not to correspond to a sphere. In the picture, the cutting steel 23 is shown in two different positions. A further method for the machining of the casing is utilizing a shape steel (in a lathe) or a profile milling cutter, and, in that way, it is possible to obtain not only circle arc curves but also other surfaces which may be suitable.

For all differential casings, being manufactured from one single piece, rather large holes are necessary for the introducing of machining tools, and for the mounting of the bevel gears. These holes constitute a weakening of the casing, resulting in annoyingly large outside dimensions. Through the rather complete machining of the differential casing, which is made possible according to the subject invention, a good control of the points, where its inside surfaces are situated, is obtained, whereby the outside dimensions of the casing can be kept at reasonable figures, this fact constituting a further advantage of a differential mechanism, according to the invention.

What I claim is:

1. A differential mechanism comprising an integral housing, means for rotating said integral housing, a pair of driven axle bevel gears rotatably mounted within said integral housing, aperture means defining an opening in said housing having a size smaller than the total size of said pair of driven axle bevel gears but larger than a single one thereof to facilitate insertion of said bevel gears in said housing, a pair of driving differential bevel pinions rotatably mounted on a shaft at right angles to the axis of said gears in the same plane thereof, each of said axle bevel gears meshing with said differential pinions, said two driving differential bevel pinions as well as said two driven axle bevel gears being machined on their back faces to provide curved rotational surfaces thereof for seating against the inside of said integral housing, and said integral housing being provided with a continuous machined curved rotational surface only in an annular region of the inside, against which said pinions and gears are seated.

2. A differential mechanism according to claim 1, wherein the curvature of said machined curved rotational surface on the inside of said housing is the same as that of the back faces of said differential pinions and said axle gears.

3. A differential mechanism according to claim 2, wherein said machined curved rotational surface on the inside of said housing and said machined back surface of said differential pinions and said axle gears are spherical surfaces.

4. A differential mechanism according to claim 1, wherein the curvature of said machined curved rotational surface on the inside of said housing is different from that of the back face of said differential pinions and said axle gears.

5. A differential mechanism according to claim 1, wherein said machined rotational surface on the inside of said housing and said machined back surfaces of said differential pinions and said axle gears are spherical surfaces, the center of curvature of said rotational surface on the inside of the housing being spaced from the intersection of the axes of said pair of differential pinions and said axle gears.

6. A differential mechanism according to claim 5, wherein said machined rotational surface on the inside of said housing is generated by a semi-circle, the center of which is spaced from the axis of rotation.

References Cited in the file of this patent

UNITED STATES PATENTS

| 1,430,367 | Ford | Sept. 26, 1922 |
| 1,641,190 | Morgan | Sept. 6, 1927 |
| 2,158,157 | Seeck | May 16, 1939 |
| 2,463,091 | Dortort | Mar. 1, 1949 |